(12) United States Patent
Fujii et al.

(10) Patent No.: US 10,801,650 B2
(45) Date of Patent: Oct. 13, 2020

(54) PIPE JOINT MADE OF SYNTHETIC RESIN

(71) Applicant: Nippon Pillar Packing Co., Ltd., Osaka-shi, Osaka (JP)

(72) Inventors: Makoto Fujii, Osaka (JP); Toshihide Iida, Osaka (JP)

(73) Assignee: Nippon Pillar Packing Co., Ltd., Osaka-shi, Osaka (JP)

( * ) Notice: Subject to any disclaimer, the term of this patent is extended or adjusted under 35 U.S.C. 154(b) by 155 days.

(21) Appl. No.: 16/141,488

(22) Filed: Sep. 25, 2018

(65) Prior Publication Data

US 2019/0024836 A1    Jan. 24, 2019

Related U.S. Application Data

(63) Continuation of application No. 15/025,762, filed as application No. PCT/JP2014/075607 on Sep. 26, 2014, now Pat. No. 10,139,028.

(30) Foreign Application Priority Data

Oct. 1, 2013    (JP) ................................. 2013-206468

(51) Int. Cl.
*F16L 19/00* (2006.01)
*F16L 19/028* (2006.01)
(Continued)

(52) U.S. Cl.
CPC .......... *F16L 19/005* (2013.01); *F16L 19/0283* (2013.01); *F16L 19/041* (2013.01); *F16L 47/041* (2019.08); *F16L 2201/10* (2013.01)

(58) Field of Classification Search
CPC ....... F16L 47/04; F16L 19/005; F16L 19/041; F16L 19/0283; F16L 2201/10
(Continued)

(56) References Cited

U.S. PATENT DOCUMENTS 5,240,289 A    8/1993    Gottling et al.
5,388,871 A    2/1995    Saitoh
(Continued)

FOREIGN PATENT DOCUMENTS

CN    1502841 A    6/2004
CN    1854592 A    11/2006
(Continued)

OTHER PUBLICATIONS

International Search Report issued in PCT/JP2014/075607 dated Dec. 22, 2014 (2 pages).
(Continued)

*Primary Examiner* — Zachary T Dragicevich
(74) *Attorney, Agent, or Firm* — Osha Liang LLP

(57) ABSTRACT

A pipe joint, made of synthetic resin, including: an inner ring; a joint body having an annular sealing groove and a male screw portion formed on an outer circumference; a union nut having a female screw portion formed on an inner circumference to be tightened onto the male screw portion of the joint body, such that a first opposing surface is formed in the joint body to be perpendicular to an axial direction, and a second opposing surface is formed in the union nut to oppose the first opposing surface. An engagement projection is provided in one of the first opposing surface and the second opposing surface. An engagement recess is provided in the other of the first opposing surface and the second opposing surface such that the engagement projection engages with the engagement recess when the union nut has been tightened up to an appropriate position.

5 Claims, 10 Drawing Sheets

(51) Int. Cl.
*F16L 19/04* (2006.01)
*F16L 47/04* (2006.01)

(58) Field of Classification Search
USPC ............. 285/92, 93, 331, 334.5, 342, 423
See application file for complete search history.

(56) References Cited

U.S. PATENT DOCUMENTS

| | | |
|---|---|---|
| 5,452,748 A | 9/1995 | Simmons et al. |
| 5,743,572 A | 4/1998 | Nishio |
| 5,746,454 A | 5/1998 | Webb |
| 5,906,398 A | 5/1999 | Larsen et al. |
| 5,951,060 A | 9/1999 | Fukano et al. |
| 6,056,326 A | 5/2000 | Guest |
| 6,089,621 A | 7/2000 | Nishio |
| 6,142,535 A | 11/2000 | Nishio et al. |
| 6,334,632 B1 | 1/2002 | Nishio et al. |
| 6,435,568 B1 | 8/2002 | Fukano et al. |
| 6,896,299 B1 | 5/2005 | Nishio |
| 7,563,993 B2 | 7/2009 | Drotleff et al. |
| 2003/0155768 A1 | 8/2003 | Hollingsworth et al. |
| 2004/0100097 A1 | 5/2004 | Fukano et al. |
| 2004/0227345 A1 | 11/2004 | Okamoto et al. |
| 2005/0073148 A1 | 4/2005 | Inoue |
| 2006/0157975 A1 | 7/2006 | Fujii et al. |
| 2006/0244256 A1 | 11/2006 | Hyobu et al. |
| 2009/0066081 A1 | 3/2009 | Katsura |
| 2011/0210544 A1 | 9/2011 | Teshima et al. |
| 2011/0221190 A1 | 9/2011 | Teshima et al. |
| 2011/0260450 A1 | 10/2011 | Imanishi et al. |
| 2016/0116096 A1 | 4/2016 | Fujii et al. |
| 2016/0215912 A1 | 7/2016 | Fujii et al. |

FOREIGN PATENT DOCUMENTS

| | | |
|---|---|---|
| CN | 1299039 C | 2/2007 |
| CN | 101382219 A | 3/2009 |
| CN | 102112792 A | 6/2011 |
| CN | 102112793 A | 6/2011 |
| CN | 102232158 A | 11/2011 |
| EP | 1233225 A1 | 8/2002 |
| EP | 1398559 A1 | 3/2004 |
| JP | H05-126288 A | 5/1993 |
| JP | H06-40576 U | 5/1994 |
| JP | H06-201081 A | 7/1994 |
| JP | H10-54489 A | 2/1998 |
| JP | H11-94178 A | 4/1999 |
| JP | H11-230463 A | 8/1999 |
| JP | H11-280965 A | 10/1999 |
| JP | 2003-166727 A | 6/2003 |
| JP | 2009-085286 A | 4/2009 |
| JP | 2010-127427 A | 6/2010 |
| JP | 2010-223291 A | 10/2010 |
| JP | 2010-223347 A | 10/2010 |
| JP | 2010-261499 A | 11/2010 |
| JP | 2010-261520 A | 11/2010 |

OTHER PUBLICATIONS

Written Opinion of the International Searching Authority issued in PCT/JP2014/075607 dated Dec. 22, 2014 (4 pages).
Office Action in corresponding U.S. Appl. No. 14/889,695 dated Sep. 9, 2016 (8 pages).
International Search Report issued in corresponding International Application No. PCT/JP2014/061429 dated Jul. 22, 2014 (2 pages).
Office Action issued in corresponding Chinese Application No. 201480025252.8 dated Oct. 27, 2016 (11 pages).
Extended European Search Report issued in corresponding European Application No. 14795010.9 dated Dec. 16, 2016 (7 pages).
Office Action issued in corresponding Chinese Application No. 201480050205.9 dated Dec. 5, 2016 (9 pages).
Office Action in copending U.S. Appl. No. 14/889,695 dated Jan. 27, 2017 (9 pages).

PIPE JOINT MADE OF SYNTHETIC RESIN

CROSS-REFERENCE TO RELATED APPLICATIONS

This is a continuation application of U.S. patent application Ser. No. 15/025,762 filed Mar. 29, 2016 (now U.S. Pat. No. 10,139,028 issued Nov. 27, 2018), which claims priority to International Patent Application No. PCT/JP2014/075607 filed Sep. 26, 2014, the contents of which are incorporated herein by reference.

TECHNICAL FIELD

The present invention relates to a pipe joint which is made of synthetic resin and used as a connecting structure for a tube, made of synthetic resin, which serves as a fluid device or a fluid path such as a pump, a valve, and a filter.

BACKGROUND ART

To date, for piping paths, of semiconductor manufacturing apparatuses, liquid crystal manufacturing apparatuses, and the like, which are required to have chemical resistance or the like, tubes or pipe joints made of synthetic resin such as fluororesin have been used. As such a pipe joint, a pipe joint that includes: a joint body to be mounted to a leading end portion of a tube; and a union nut having a female screw portion to be tightened onto a male screw portion formed on the outer circumferential portion of the joint body, is often used. The pipe joint has a structure in which the union nut is tightened onto the outer circumferential portion of the joint body, to assuredly obtain a sealing performance between the joint body and the tube.

For example, in a pipe joint made of resin as described in Patent Literature 1, an inner ring (fitting portion) is pressed into a leading end portion of a tube (tubing) made of synthetic resin such that a fluid path is formed by an inner circumferential portion of the inner ring, and the inner ring has a protrusion that protrudes radially outward. The tube, which has been deformed so as to have its diameter enlarged by the protrusion of the inner ring being pressed into the tube, is inserted into a receiver opening of a joint body. In this state, a female screw portion formed in the inner circumference of a union nut (pressing ring) is screwed onto a male screw portion formed on the outer circumference of the joint body, whereby the tube and the inner ring are pressed in the axial direction by the union nut, and the tube is connected to the joint body.

In the above structure, in order to assuredly obtain a favorable sealing performance, a degree of tightening of the union nut onto the joint body needs to be controlled so as to represent an appropriate value. As a method for controlling a degree of tightening, for example, a method for controlling a tightening torque by gradually tightening the union nut by using a tool such as a spanner, or a method for controlling a degree of tightening while repeatedly measuring a tightening extent with the use of a feeler gauge or the like, is known.

CITATION LIST

Patent Literature

PATENT LITERATURE 1: Japanese Laid-Open Patent Publication No. H10-54489

In recent years, reduction in size of a semiconductor manufacturing apparatus or the like has been developed, and a degree of integration of components mounted in the apparatus is increased. Therefore, an operator is forced to blindly control a degree of tightening of the union nut in a narrow space under present circumstances.

In addition, the above method for controlling a degree of tightening has the following features. That is, in the method for controlling a tightening torque, a torque error occurs for each tool in use, so that a degree of tightening is likely to vary. Further, in the method for controlling a gap dimension, a lead over which the union nut moves, in the axial direction, relative to a turning angle of the union nut, is very small, and a point of time at which the tightening is to be finished varies depending on each operator, so that a degree of tightening is likely to vary.

SUMMARY OF INVENTION

One or more embodiments of the present invention are made to provide a pipe joint, made of synthetic resin, that allows a degree of tightening of a union nut to be appropriately controlled.

In one or more embodiments, a pipe joint made of synthetic resin includes: an inner ring having a protrusion formed on an outer circumference at one end portion in an axial direction, the protrusion being pressed into a leading end portion of a tube made of synthetic resin; a joint body made of synthetic resin, the joint body having, on an inner circumferential side, an annular sealing groove into which the other end portion, of the inner ring, in the axial direction is pressed in a state where the protrusion is pressed into the leading end portion of the tube, the joint body having a male screw portion formed on an outer circumference thereof; and a union nut made of synthetic resin, the union nut having, on an inner circumference thereof, a female screw portion to be tightened onto the male screw portion of the joint body in a state where the other end portion, of the inner ring, in the axial direction is pressed into the sealing groove. In the pipe joint made of synthetic resin, a first opposing surface is formed in the joint body so as to be perpendicular to the axial direction, and a second opposing surface is formed in the union nut so as to oppose the first opposing surface. An engagement projection is provided in one of the first opposing surface and the second opposing surface so as to project toward the other of the first opposing surface and the second opposing surface. An engagement recess is provided in the other of the first opposing surface and the second opposing surface and formed such that the engagement projection engages with the engagement recess when the union nut has been tightened up to an appropriate position.

According to one or more embodiments of the present invention, when the union nut has been tightened up to an appropriate position, the engagement projection engages with the engagement recess. Therefore, an operator is allowed to easily confirm, by the engagement, that a degree of tightening of the union nut has reached an appropriate value. Thus, the tightening of the union nut can be appropriately controlled.

In the pipe joint made of synthetic resin, the engagement projection contacts the other of the first opposing surface and the second opposing surface immediately before the engagement projection engages with the engagement recess. In this case, when the union nut has been tightened up to a position immediately before an appropriate position, the engagement projection is brought into contact with the opposing surface, thereby increasing the tightening resistance. Therefore, it can be more easily confirmed that the union nut has been tightened up to a position immediately before the appropriate position.

In one or more embodiments pipe joint made of synthetic resin further includes a regulation portion that is provided at a position adjacent to the engagement recess of the other of the first opposing surface and the second opposing surface so as to project toward the one of the first opposing surface and the second opposing surface, and that is configured to regulate screwing in a tightening direction in a state where the engagement projection has engaged with the engagement recess.

In this case, further tightening of the union nut from an appropriate position can be regulated by the regulation portion. Therefore, when a degree of tightening of the union nut has reached an appropriate value, the tightening can be assuredly ended.

In one or more embodiments, the pipe joint made of synthetic resin further includes: a first projection provided at a predetermined position on the outer circumference of the joint body, so as to project radially outward; and a second projection provided at a predetermined position on an outer circumference of the union nut, so as to project radially outward. The first projection and the second projection are disposed such that a position of the first projection and a position of the second projection in a circumferential direction are the same when the engagement projection has engaged with the engagement recess.

In this case, when the union nut has been tightened up to an appropriate position, the position of the first projection and the position of the second projection in the circumferential direction are made the same. Therefore, the state in which the positions are the same is visually confirmed, whereby it can be more easily confirmed that a degree of tightening of the union nut has reached an appropriate value. Further, when a degree of tightening is checked, it is visually confirmed that the position of the first projection and the position of the second projection in the circumferential direction are the same, whereby it can be easily confirmed that the union nut is at an appropriate position. Therefore, check operation is facilitated.

In one or more embodiments, the first projection has a joint body side end surface which is a portion of the first opposing surface, and a portion of the engagement projection or the engagement recess provided in the first opposing surface is formed in the joint body side end surface.

In this case, since a portion of the engagement projection or the engagement recess is formed in the joint body side end surface of the first projection, the strength can be enhanced as compared to a case where the engagement projection or the engagement recess is formed only in a portion, of the first opposing surface, other than the joint body side end surface. Therefore, durability of the engagement projection or the engagement recess which is repeatedly used, can be enhanced.

In one or more embodiments, the second projection has a union nut side end surface which is a portion of the second opposing surface, and a portion of the engagement projection or the engagement recess provided in the second opposing surface is formed in the union nut side end surface.

In this case, since a portion of the engagement projection or the engagement recess is formed in the union nut side end surface of the second projection, the strength can be enhanced as compared to a case where the engagement projection or the engagement recess is formed only in a portion, of the second opposing surface, other than the union nut side end surface. Therefore, durability of the engagement projection or the engagement recess which is repeatedly used, can be enhanced.

Advantageous Effects

The pipe joint made of synthetic resin according to one or more embodiments of the present invention allows a degree of tightening of a union nut to be appropriately controlled.

DESCRIPTION OF EMBODIMENTS

Hereinafter, embodiments of a pipe joint made of synthetic resin according to one or more embodiments the present invention will be described with reference to the drawings.

Figure 1:
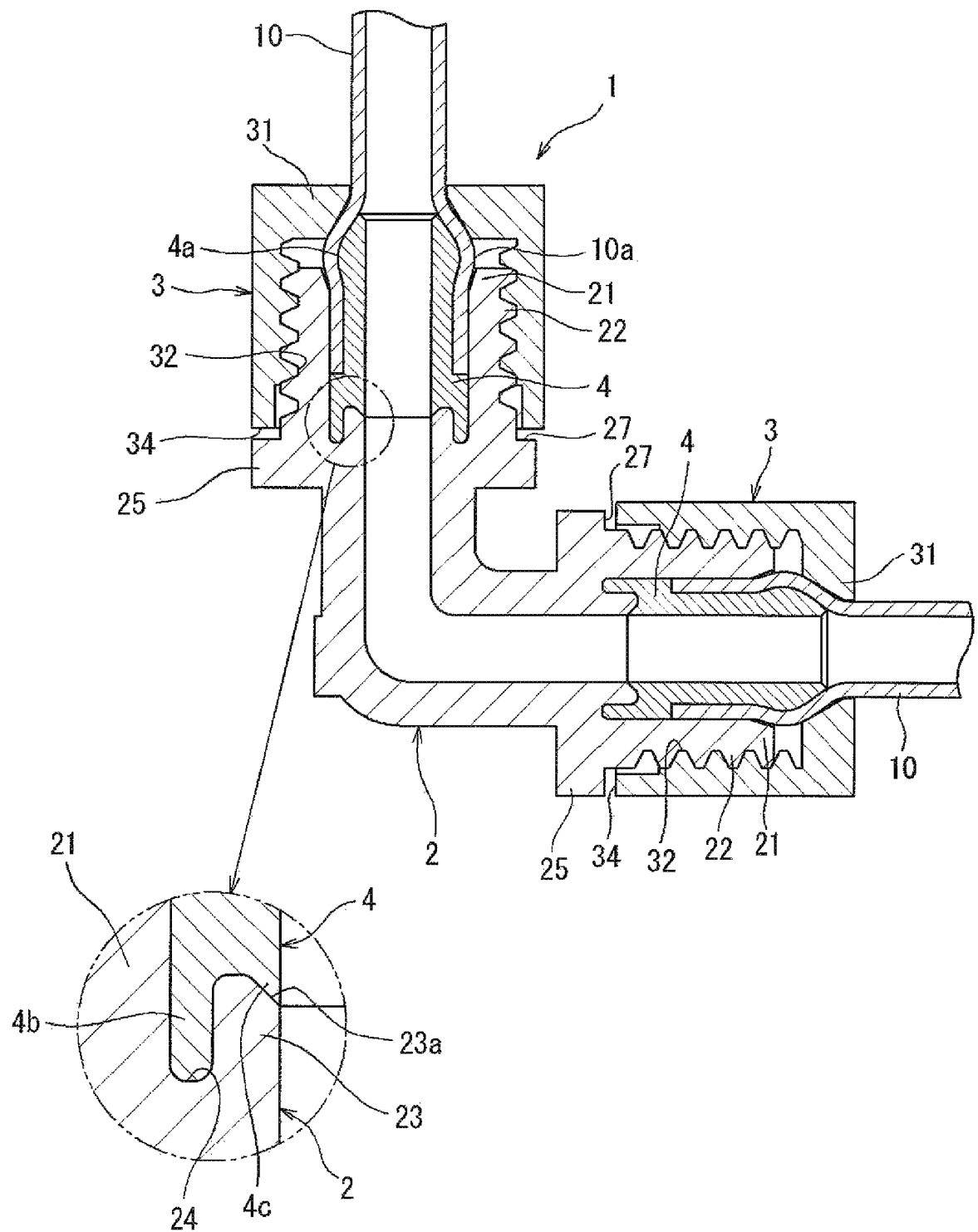
FIG. 1 is a cross-sectional view of a pipe joint made of synthetic resin according to a first example of one or more embodiments of the present invention.

FIG. 1 is a cross-sectional view of a pipe joint made of synthetic resin according to a first example of one or more embodiments of the present invention. In FIG. 1, a pipe joint 1 made of synthetic resin includes an elbow-shaped joint body 2, a union nut 3, and an inner ring 4. The joint body 2 is made of synthetic resin and mounted on the outer circumferential side of a leading end portion of a tube 10 made of synthetic resin (PFA or the like). The union nut 3 is made of synthetic resin and mounted on the outer circumferential side of the joint body 2. The inner ring 4 is made of synthetic resin and mounted on the inner circumferential side of the leading end portion of the tube 10. The pipe joint 1 made of synthetic resin according to the present embodiment is used under an environment where the maximum working pressure is 0.4 MPa, and the maximum operating temperature is less than or equal to 100°.

In the present embodiment, the directions from a bent portion of the joint body 2 toward both openings at end portions thereof are each referred to as an axially outward direction (axially outer side), and the directions from both the openings at the end portions of the joint body 2 toward the bent portion thereof are each referred to as the axially inward direction (axially inner side).

The inner ring 4 is formed so as to be cylindrical, and the inner diameter thereof is set so as to be almost equal, in dimension, to the inner diameter of the tube 10 such that movement of fluid is not prevented. A protrusion 4a is formed on the outer circumference of an end portion (one end portion in the axial direction), on the axially outer side, of the inner ring 4, and protrudes radially outward. The protrusion 4a is pressed into the leading end portion of the tube 10, to enlarge the diameter of the leading end portion.

A sealing projection 4b having a cylindrical shape is formed in the end portion (the other end portion in the axial direction), on the axially inner side, of the inner ring 4 so as to project from the leading end portion of the tube 10 in the axially inward direction. A tilted projection 4c is formed in a portion inward of the inner circumference of the sealing projection 4b so as to have its outer diameter gradually reduced in the axially inward direction. The outer diameter of the sealing projection 4b is set so as to be almost equal, in dimension, to the outer diameter of the leading end of the tube 10.

The joint body 2 is made of a synthetic resin material such as PVC, PA, PP, PE, or fluororesin (such as PFA or PTFE). The inner diameter of the joint body 2 is set so as to be almost equal, in dimension, to the inner diameter of the inner ring 4. A receiver opening portion 21 is formed on the axially outer end portion of the joint body 2 and allows the leading end portion of the tube 10 having the inner ring 4 pressed therein to be inserted into the joint body 2. A male screw portion 22 that includes a trapezoidal screw is formed on the outer circumference of the receiver opening portion 21.

The joint body 2 has a cylindrical sealing tubular portion 23 formed radially inward of the axially inner end portion of the receiver opening portion 21. A tilted surface 23a is formed on the axially outer end portion of the sealing tubular portion 23 so as to have its inner diameter gradually enlarged in the axially outward direction. An annular sealing groove 24 is formed between the outer circumferential surface of the sealing tubular portion 23 and the opposing inner circumferential surface of the receiver opening portion 21. Into the annular sealing groove 24, the sealing projection 4b of the inner ring 4 is inserted. The end portion of the sealing projection 4b is brought into contact with or made close to the bottom portion of the sealing groove 24.

The union nut 3 is made of a synthetic resin material such as PVC, PA, PP, PE, or fluororesin (such as PFA or PTFE), similarly to the joint body 2, and is formed so as to have a cylindrical shape. The inner diameter of the union nut 3 is slightly greater than the outer diameter of the tube 10. When the joint body 2 is mounted to the leading end portion of the tube 10, the leading end portion (a portion in which the diameter is not enlarged) of the tube 10 is inserted into the union nut 3.

The union nut 3 has: a pressing portion 31 formed on the axially outer end portion so as to project radially inward; and a female screw portion 32 that includes a trapezoidal screw formed on the inner circumference of the axially center portion. The female screw portion 32 can be tightened onto the male screw portion 22 of the joint body 2. The male screw portion 22 and the female screw portion 32 of the present embodiment are formed so as to tighten the union nut 3 the small number of rotation times (for example, 1.5 rotation times) such that the union nut 3 is allowed to be manually tightened as described below.

In the above structure, in a state where the sealing projection 4b of the inner ring 4 having been pressed into the tube 10 is inserted into the receiver opening portion 21 of the joint body 2, the union nut 3 is screwed in the axially inward direction of the joint body 2, thereby connecting the tube 10 to the joint body 2. At this time, the pressing portion 31 of the union nut 3 presses, in the axially inward direction, a diameter-enlarged portion 10a which is on the outer circumferential surface of the tube 10 and is protruded radially outward by the protrusion 4a. Thus, the end portion of the sealing projection 4b is brought into contact with or made close to the bottom portion of the sealing groove 24. Further, the outer circumferential surface of the tilted projection 4c is brought into pressure contact with the tilted surface 23a in the axially outer end portion of the sealing tubular portion 23, the inner circumferential surface of the sealing projection 4b is brought into pressure contact with the outer circumferential surface of the sealing tubular portion 23, and the outer circumferential surface of the sealing projection 4b is brought into pressure contact with the inner circumferential surface of the receiver opening portion 21 to assure a sealing performance for fluid.

Thus, the pipe joint 1 made of synthetic resin according to the present embodiment is structured such that the sealing projection 4b of the inner ring 4 is inserted into the sealing groove 24 of the joint body 2, whereby pressing force of the sealing projection 4b in the radially inward and outward directions is used to assure the sealing performance. Therefore, the union nut 3 need not be firmly tightened in the axially inward direction. Therefore, in the above-mentioned use environment, the pipe joint 1 made of synthetic resin allows the sealing performance to be sufficiently assured by the union nut 3 being manually tightened. Thus, a tightening tool such as a spanner need not be used, thereby facilitating tightening operation.

Figure 2:
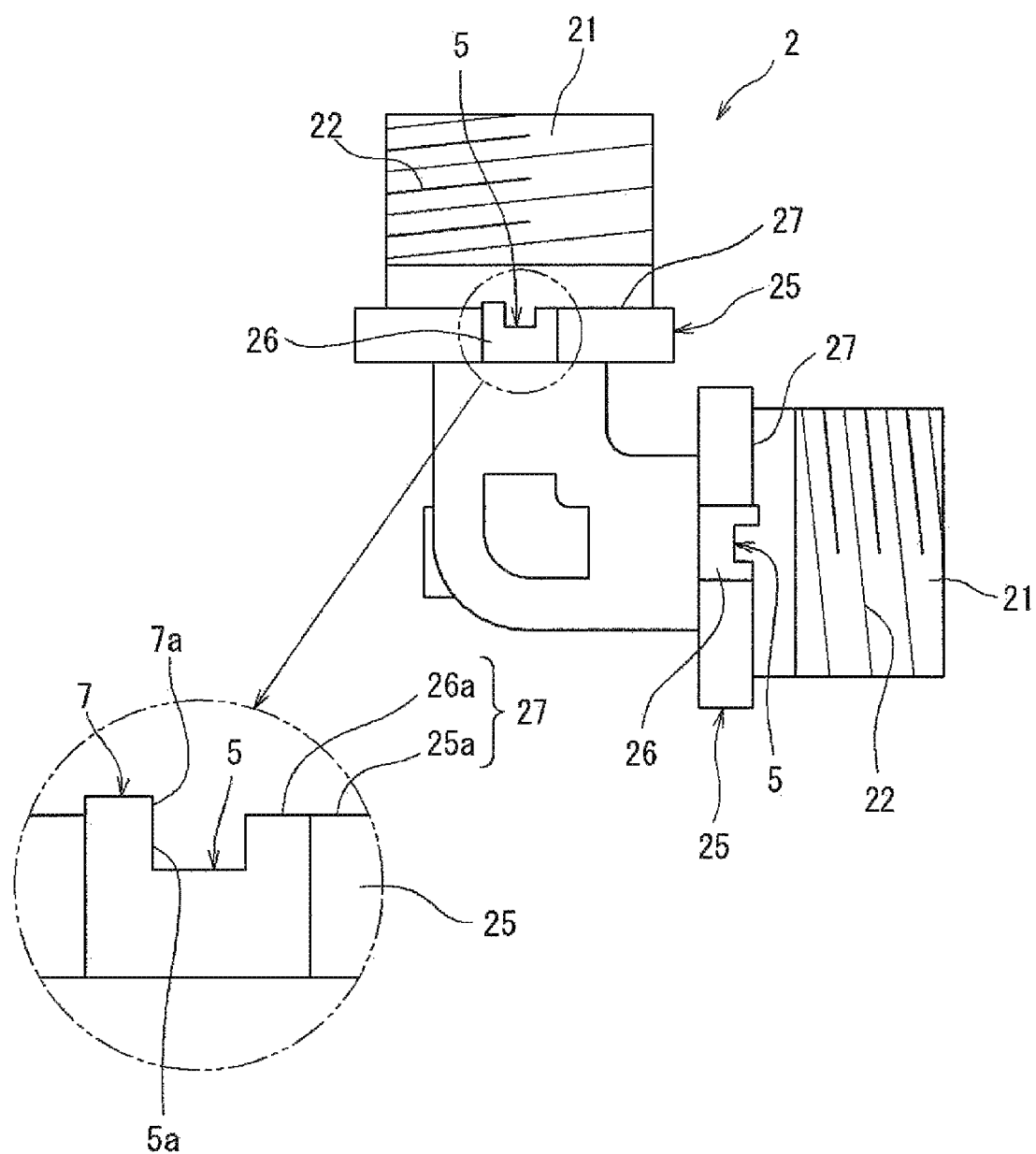
FIG. 2 is a side view of a joint body of the pipe joint made of synthetic resin.
Figure 3:
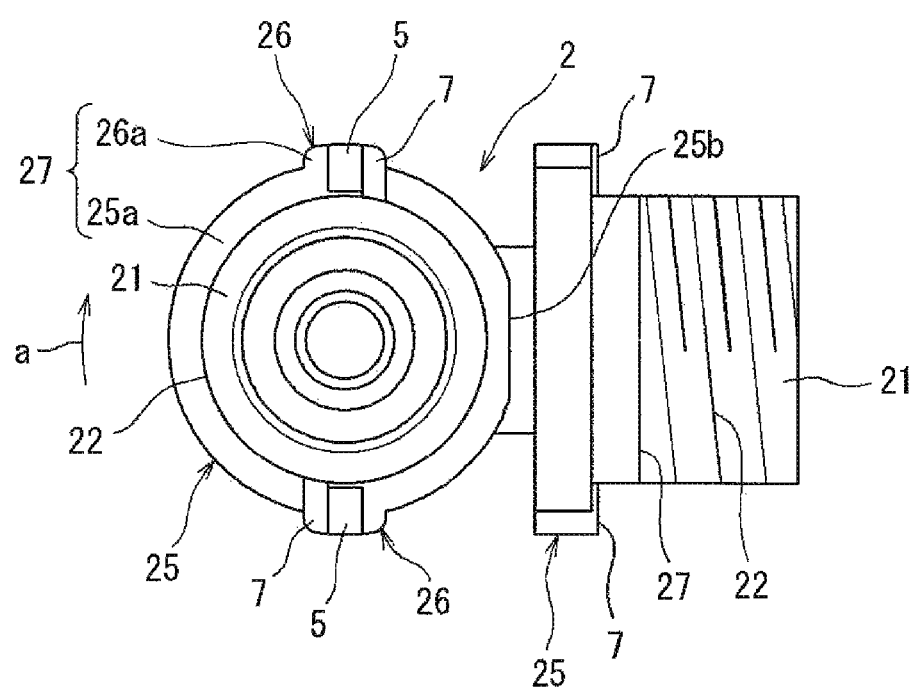
FIG. 3 is a plan view of the joint body.

FIG. 2 is a side view of the joint body 2. FIG. 3 is a plan view of the joint body 2. In FIG. 2 and FIG. 3, a flange portion 25 having almost an annular shape is formed, integrally with the joint body 2, on the outer circumferential portion, of the joint body 2, which is axially inward of the male screw portion 22. First projections 26 are formed on the outer circumferential surface of the flange portion 25 so as to project radially outward. The first projections 26 are formed at predetermined positions in the circumferential direction so as to be integrated with the flange portion 25. The number of the first projections 26 of the present embodiment is two, and the two first projections 26 are formed on the outer circumferential surface of the flange portion 25 so as to be spaced from each other by 180° in the circumferential direction. Further, a flat portion 25b is formed on the outer circumferential surface of the flange portion 25 at a predetermined position in the circumferential direction.

As shown in FIG. 2, the first projections 26 are formed over the entire length of the flange portion 25 in the axial direction. An end surface (joint body side end surface) 26a, on the axially outer side, of each first projection 26 is coplanar with an end surface 25a, on the axially outer side, of the flange portion 25. Both of the end surfaces 25a and 26a form a first opposing surface 27 that is perpendicular to the axial direction. The first opposing surface 27 has an engagement recess 5 that is recessed in the axially inward direction.

As shown in FIG. 3, the engagement recess 5 of the present embodiment is formed by both the end surfaces 25a and 26a being cut. Therefore, the number of the engagement recesses 5 of the present embodiment is two, and the two engagement recesses 5 are formed in the first opposing surface 27 so as to be spaced from each other by 180° in the circumferential direction. The engagement recesses 5 are formed as long grooves that are opened on the outer circumferential surfaces of the first projections 26 and extend radially inward in a planar view. Thus, since a portion of each engagement recess 5 is formed in the end surface 26a of the first projection 26, the strength of the engagement recesses 5 can be enhanced as compared to a case where each engagement recess 5 is formed only in the end surface 25a of the first opposing surface 27. Therefore, durability of the engagement recesses 5 which are repeatedly used, can be enhanced.

Regulation portions 7 are formed, integrally with the first opposing surface 27, at positions adjacent to the respective engagement recesses 5 of the first opposing surface 27 so as to project axially outward. Each regulation portion 7 is disposed downstream of the corresponding engagement recess 5 in the direction (the direction indicated by an arrow a in FIG. 3) in which the union nut 3 is screwed. A side surface 7a, of each regulation portion 7, on the engagement recess 5 side is coplanar with a side surface 5a, of the engagement recess 5, on the regulation portion 7 side, and the side surface 7a is a surface with which an engagement projection 6 described below contacts.

Figure 4:
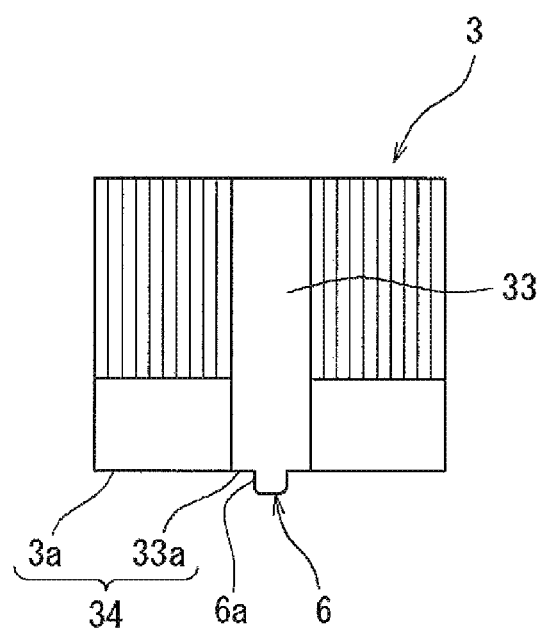
FIG. 4 is a side view of a union nut of the pipe joint made of synthetic resin.
Figure 5:
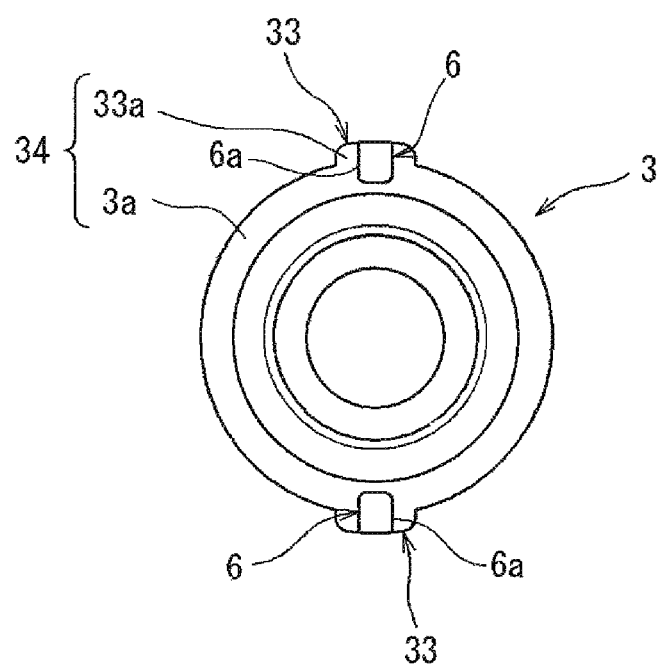
FIG. 5 is a bottom view of the union nut.

FIG. 4 is a side view of the union nut 3. FIG. 5 is a bottom view of the union nut 3. In FIG. 4 and FIG. 5, second projections 33 are formed on the outer circumference of the union nut 3 so as to project radially outward. The second projections 33 are formed at predetermined positions in the circumferential direction so as to be integrated with the union nut 3. The number of the second projections 33 of the present embodiment is two, and the two second projections 33 are formed on the outer circumferential surface of the union nut 3 so as to be spaced from each other by 180° in the circumferential direction.

As shown in FIG. 4, the second projections 33 are formed over the entire length of the union nut 3 in the axial direction, and are used as a grip portion to be held when the union nut 3 is manually tightened. When the engagement projections 6 described below engage with the engagement recesses 5, each first projection 26 of the joint body 2 and the corresponding second projection 33 of the union nut 3 are disposed at the same position in the circumferential direction (see FIG. 7).

An end surface (union nut side end surface) 33a of each second projection 33 on the axially inner side (lower side in the drawing) is formed so as to be coplanar with an end surface 3a of the union nut 3 on the axially inner side. Both the end surfaces 3a and 33a form a second opposing surface 34 that is perpendicular to the axial direction, and opposes the first opposing surface 27 (also see FIG. 1). The engagement projections 6 are formed so as to be integrated with the second opposing surface 34 and project in the axially inward direction.

As shown in FIG. 5, each engagement projection 6 of the present embodiment extends from the radially outer end of the end surface 33a of the second projection 33 to the end surface 3a of the union nut 3 in the radially inward direction. Therefore, the number of the engagement projections 6 of the present embodiment is two, and the two engagement projections 6 are formed on the second opposing surface 34 so as to be spaced from each other by 180° in the circumferential direction. Thus, since a portion of each engagement projection 6 is formed on the end surface 33a of the second projection 33, the strength of the engagement projections 6 can be enhanced as compared to a case where each engagement projection 6 is formed only on the end surface 3a of the second opposing surface 34. Therefore, durability of the engagement projections 6 which are repeatedly used, can be enhanced.

The engagement projections 6 are engageable with the engagement recesses 5 of the joint body 2. The projection of each engagement projection 6 in the axially inward direction is set such that the engagement projections 6 contact the first opposing surface 27 immediately before the engagement projections 6 engage with the engagement recesses 5 (just before the engagement recesses 5). Each engagement projection 6 has a side surface 6a that contacts the contact surface 7a of the regulation portion 7 when the engagement projections 6 engage with the engagement recesses 5.

Next, a procedure in which the union nut 3 is tightened will be described with reference to FIG. 6 and FIG. 7.

Figure 6:
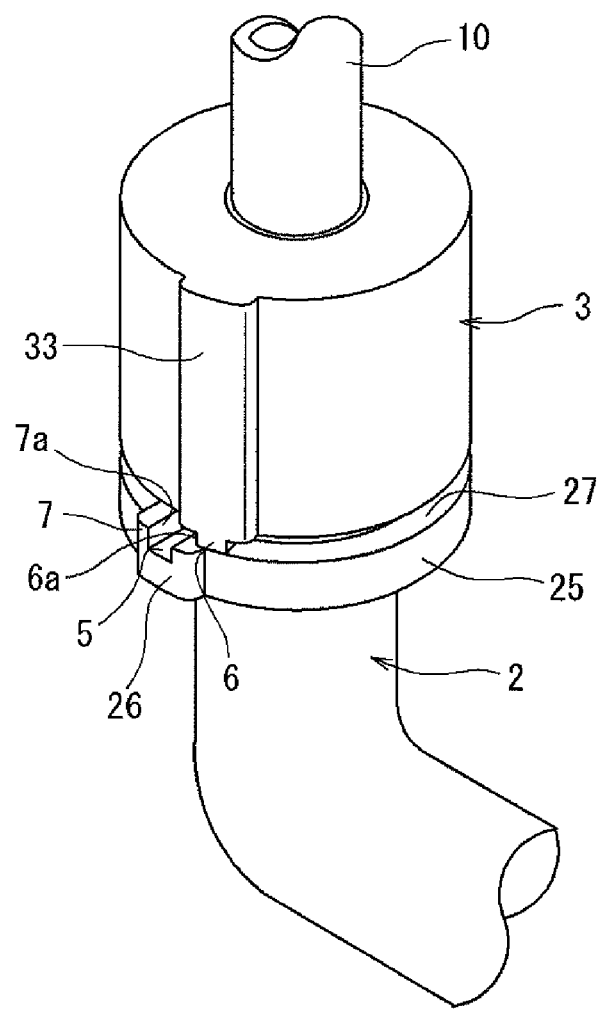
FIG. 6 is a perspective view illustrating a state where the union nut is being tightened.

After start of manually tightening of the union nut 3 onto the joint body 2, when, as shown in FIG. 6, the union nut 3 has been screwed up to a position immediately before an appropriate position at which a degree of tightening becomes appropriate, that is, up to a position immediately before a position at which the engagement projections 6 engage with the engagement recesses 5, the end surfaces of the engagement projections 6 hit against the first opposing surface 27. Thus, the tightening resistance of the union nut 3 is rapidly increased, and an operator is therefore allowed to more easily confirm that the union nut 3 has been tightened up to a position immediately before the appropriate position.

Figure 7:
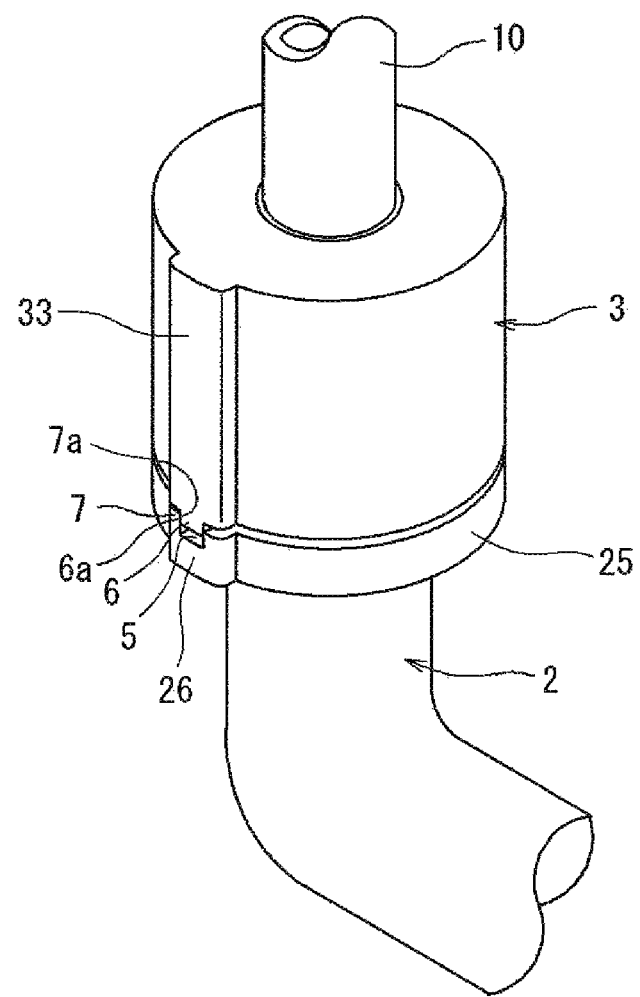
FIG. 7 is a perspective view illustrating a state where the union nut has been tightened up to an appropriate position.

Thereafter, when the union nut 3 is further tightened against the tightening resistance, the engagement projections 6 together with the union nut 3 are screwed forward while the engagement projections 6 slidably contact the first opposing surface 27, and the engagement projections 6 engage with the engagement recesses 5 as shown in FIG. 7. At this time, the engagement projections 6 are released from sliding resistance against the first opposing surface 27, whereby the tightening resistance of the union nut 3 is rapidly decreased. Thus, an operator is allowed to easily confirm that the degree of tightening of the union nut 3 has reached an appropriate value, thereby appropriately controlling the tightening of the union nut 3.

Further, when the engagement projections 6 have engaged with the engagement recesses 5, the position of each first projection 26 and the position of the corresponding second projection 33 in the circumferential direction are the same. Therefore, the state in which the positions in the circumferential direction are the same is visually confirmed, whereby it can be more easily confirmed that the degree of tightening of the union nut 3 has reached an appropriate value. Further, in a case where a degree of tightening of the union nut 3 is to be periodically checked, it can be visually confirmed that the position of each first projection 26 and the position of the corresponding second projection 33 in the circumferential direction are the same, whereby it can be easily confirmed that the union nut 3 is at an appropriate position. Therefore, check operation is facilitated.

Further, when the engagement projections 6 have engaged with the engagement recesses 5, the side surface 6a of each engagement projection 6 contacts the contact surface 7a of the corresponding regulation portion 7. Thus, further screwing of the union nut 3 from the appropriate position in the tightening direction can be regulated, whereby the tightening can be assuredly ended when the degree of tightening of the union nut 3 has reached an appropriate value.

Figure 8:
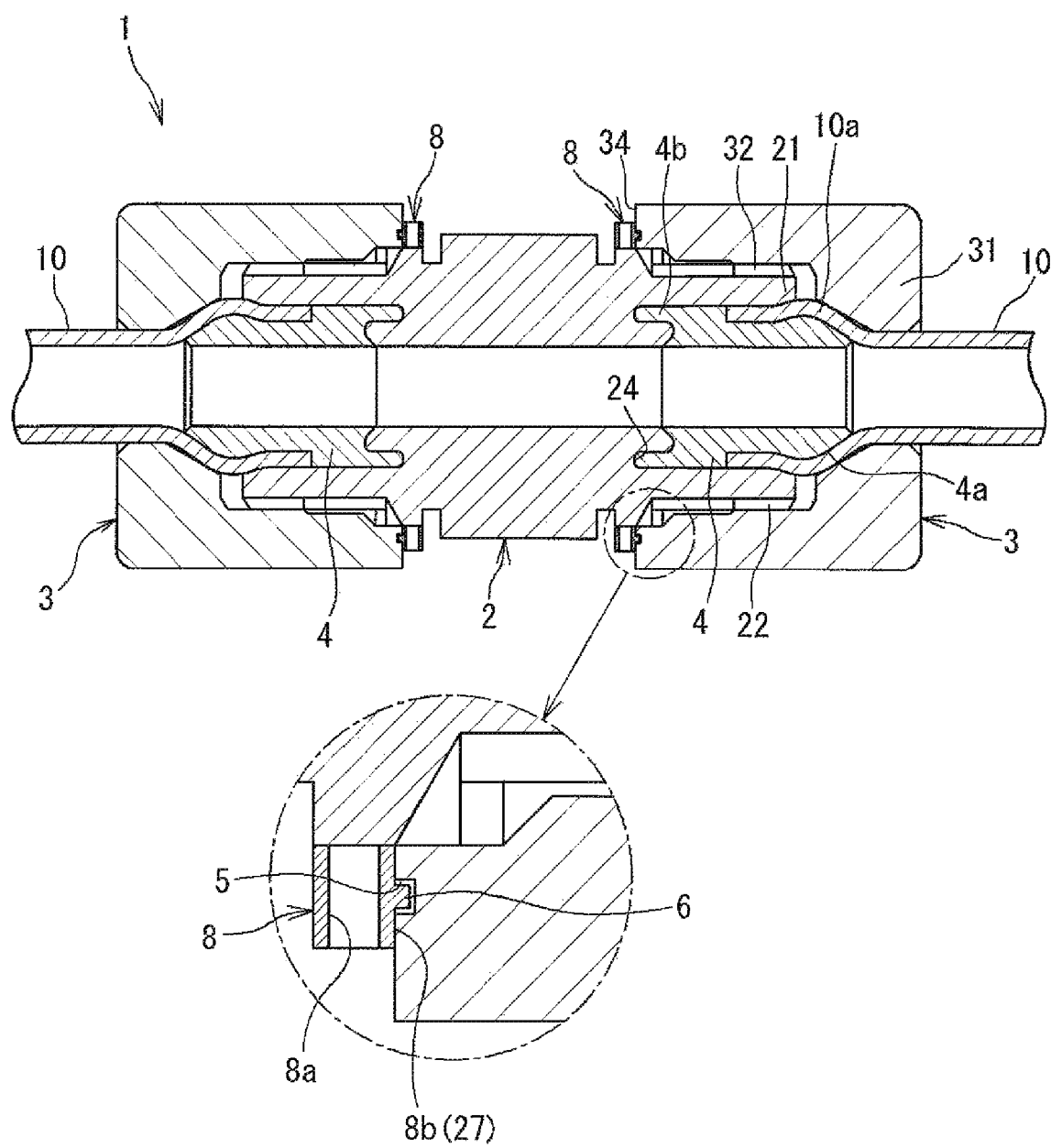
FIG. 8 is a cross-sectional view of a pipe joint made of synthetic resin according to a second example of one or more embodiments of the present invention.
Figure 9:
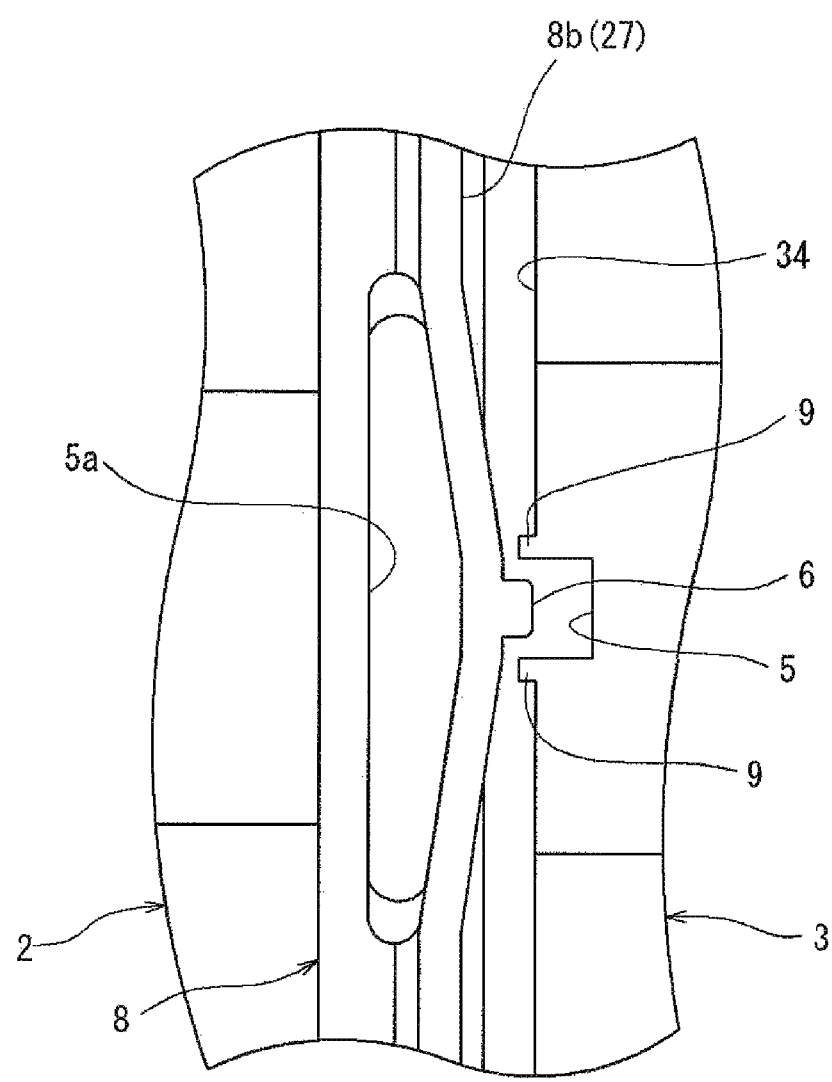
FIG. 9 is a side view of a main portion of the pipe joint, made of synthetic resin, shown in FIG. 8.

FIG. 8 is a cross-sectional view of a pipe joint made of synthetic resin according to a second example of one or more embodiments of the present invention. FIG. 9 is a side view of a main portion of the pipe joint made of synthetic resin. In FIG. 8 and FIG. 9, in the pipe joint 1 made of synthetic resin according to the present embodiment, an annular gauge ring 8 instead of the flange portion is separately mounted on the outer circumference of a straight joint body 2.

In the present embodiment, directions from the axially center portion of the joint body 2 toward openings on both end portions in the axial direction are each referred to as an axially outward direction (axially outer side), and directions from the openings on both the end portions, in the axial direction, of the joint body 2 toward the axially center portion thereof are each referred to an axially inward direction (axially inner side).

In the gauge ring 8, a plurality of long holes 8a are formed at predetermined intervals so as to extend along the circumferential direction. An end surface 8b, on the axially outer side, of the gauge ring 8 serves as the first opposing surface 27 that opposes the second opposing surface 34 of the union nut 3. In the first opposing surface 27 of the gauge ring 8, the engagement projections 6 are each formed at a position corresponding to the center portion, in the longitudinal direction, of the long hole 8a, and the engagement projections 6 are integrated with the first opposing surface 27 and project axially outward.

Meanwhile, in the second opposing surface 34 of the union nut 3, the engagement recesses 5 with which the engagement projections 6 engage are formed. Further, the second opposing surface 34 has projections 9. The projections 9 are formed, at positions adjacent to each engagement recess 5, on both sides thereof in the circumferential direction, and the projections 9 are integrated with the second opposing surface 34 and project axially inward. The other components of the present embodiment are the same as in the first embodiment, and the description thereof is not given.

Next, a procedure in which the union nut 3 of the present embodiment is tightened will be described with reference to FIG. 9 and FIG. 10.

Figure 10:
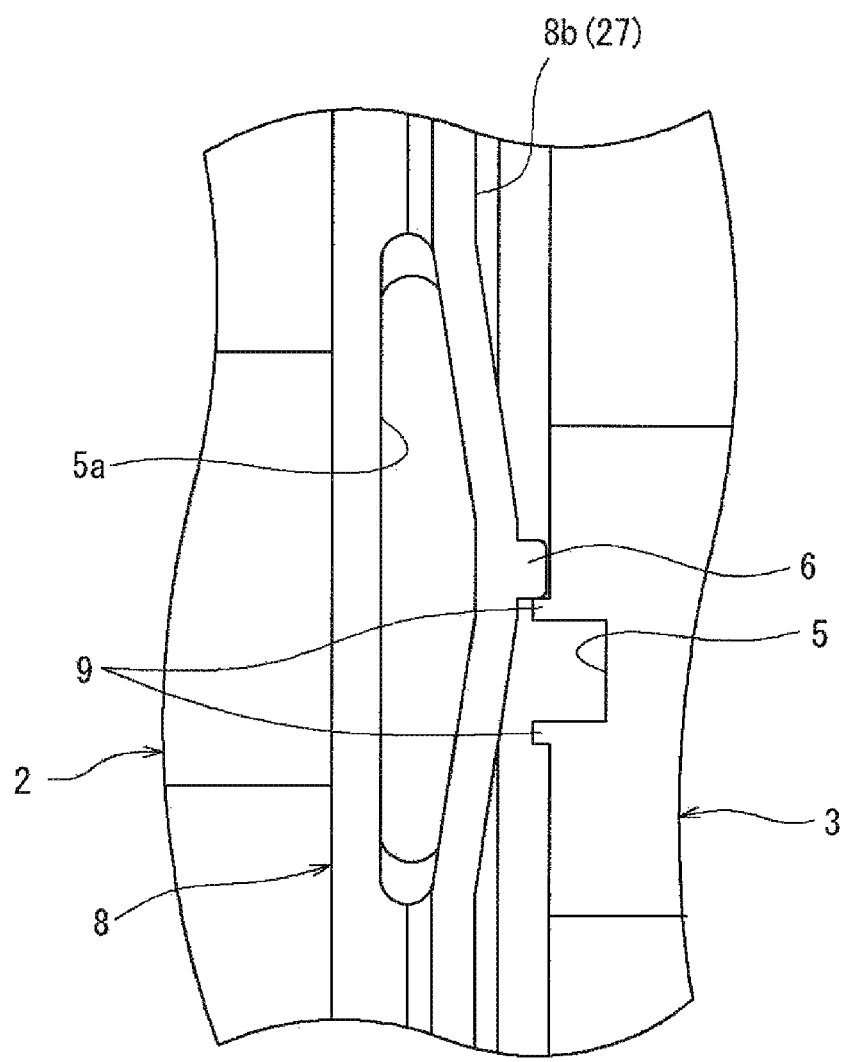
FIG. 10 is a side view illustrating a state where a union nut of the pipe joint, made of synthetic resin, shown in FIG. 8 is being tightened.

After start of manually tightening of the union nut 3 onto the joint body 2, when, as shown in FIG. 10, the union nut 3 has been screwed up to a position immediately before an appropriate position, that is, up to a position immediately before a position at which the engagement projections 6 engage with the engagement recesses 5, the projection 9 hits against the end portion of the engagement projection 6. Thus, an operator is allowed to easily confirm that the union nut 3 has been tightened up to a position immediately before the appropriate position.

Thereafter, when the union nut 3 has been further tightened, the projection 9 is moved over the engagement projection 6 to engage the engagement projections 6 with the engagement recesses 5. When the projection 9 is moved over the engagement projection 6, the tightening resistance of the union nut 3 is rapidly increased, and when the projection 9 has been moved over the engagement projection 6, the tightening resistance of the union nut 3 is rapidly decreased. Thus, an operator is allowed to easily confirm that the degree of tightening of the union nut 3 has reached an appropriate value, thereby appropriately controlling the tightening of the union nut 3.

The present invention is not limited to the above embodiments. For example, in the first embodiment, the engagement recesses 5 and the regulation portions 7 are provided in the joint body 2, and the engagement projections 6 are provided in the union nut 3. However, the engagement projections 6 may be provided in the joint body 2, and the engagement recesses 5 and the regulation portions 7 may be provided in the union nut 3.

Further, in the second embodiment, the engagement projections 6 are provided in the joint body 2, and the engagement recesses 5 and the projections 9 are provided in the union nut 3. However, the engagement recesses 5 and the projections 9 may be provided in the joint body 2, and the engagement projections 6 may be provided in the union nut 3. Further, the pipe joint 1 made of synthetic resin according to the second embodiment may include the first projection 26, the second projection 33, or the regulation portion 7, as in the first embodiment. Further, the joint body 2 of the first embodiment may have a shape, such as a straight-shape, other than the elbow-shape, and the joint body 2 of the second embodiment may have a shape, such as an elbow-shape, other than the straight shape.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1 pipe joint made of synthetic resin
2 joint body
3 union nut
4 inner ring
4a protrusion
5 engagement recess
6 engagement projection
7 regulation portion
8 gauge ring
10 tube
22 male screw portion
24 sealing groove
26 first projection
26a end surface (joint body side end surface)
27 first opposing surface
32 female screw portion
33 second projection
33a end surface (union nut side end surface)
34 second opposing surface

The invention claimed is:

1. A pipe joint made of synthetic resin, the pipe joint comprising:
an inner ring having a protrusion formed on an outer circumference at one end portion in an axial direction, the protrusion being pressed into a leading end portion of a tube made of synthetic resin;
a joint body made of synthetic resin, the joint body having, on an inner circumferential side, an annular sealing groove into which the other end portion, of the inner ring, in the axial direction is pressed in a state where the protrusion is pressed into the leading end portion of the tube, the joint body having a male screw portion formed on an outer circumference thereof; and
a union nut made of synthetic resin, the union nut having, on an inner circumference thereof, a female screw portion to be tightened onto the male screw portion of the joint body in a state where the other end portion, of the inner ring, in the axial direction is pressed into the sealing groove, wherein:
a first opposing surface is formed in the joint body so as to be perpendicular to the axial direction,
a second opposing surface is formed in the union nut so as to oppose the first opposing surface,
the pipe joint made of synthetic resin further comprises:
an engagement projection provided in one of the first opposing surface and the second opposing surface so as to project toward the other of the first opposing surface and the second opposing surface;
an engagement recess provided in the other of the first opposing surface and the second opposing surface, the engagement recess being formed such that the engagement projection engages with the engagement recess when the union nut has been tightened up to an appropriate position;

a first projection that projects radially outward is disposed, in a circumferential direction, on only part of the outer circumference of the joint body, in a plan view in an axial direction of the joint body; and a second projection that projects radially outward is disposed, in the circumferential direction, on only part of an outer circumference of the union nut, in a plan view in an axial direction of the union nut, wherein the first projection and the second projection are disposed such that a position of the first projection and a position of the second projection, in the circumferential direction, are the same when the engagement projection has engaged with the engagement recess.

2. The pipe joint made of synthetic resin according to claim 1, wherein the engagement projection contacts the other of the first opposing surface and the second opposing surface immediately before the engagement projection engages with the engagement recess.

3. The pipe joint made of synthetic resin according to claim 1, further comprising a regulation portion provided at a position adjacent to the engagement recess of the other of the first opposing surface and the second opposing surface so as to project toward the one of the first opposing surface and the second opposing surface, the regulation portion configured to regulate screwing in a tightening direction in a state where the engagement projection has engaged with the engagement recess.

4. The pipe joint made of synthetic resin according to claim 1, wherein
the first projection has a joint body side end surface which is a portion of the first opposing surface, and
a portion of the engagement projection or the engagement recess provided in the first opposing surface is formed in the joint body side end surface.

5. The pipe joint made of synthetic resin according to claim 1, wherein
the second projection has a union nut side end surface which is a portion of the second opposing surface, and
a portion of the engagement projection or the engagement recess provided in the second opposing surface is formed in the union nut side end surface.

* * * * *